3,077,054
EROSION CONTROL
Heiko Niemeijer, Groningen, Netherlands, assignor to W. A. Scholten's Chemische Fabrieken N.V., Groningen, Netherlands, a corporation of the Netherlands
No Drawing. Filed June 20, 1960, Ser. No. 37,041
Claims priority, application Netherlands June 22, 1959
5 Claims. (Cl. 47—9)

It is known that owing to water and wind erosion very extensive areas of the earth have been lost as cultivable land and that the erosion process is still going on. The evil of soil drifts especially manifests itself in spring, but may also occur in winter. In spring the resultant damage consists in young crops being damaged, in the roots of grass just sown being blown bare, in seeds and fertilizers just scattered being blown about and in important constituents of the furrow being blown away. The recovery of soil displaced by the wind sometimes entails a heavy expenditure.

Erosion by wind and water may occur furthermore in regions that are entirely or substantially entirely sandy, such, for example, as the dunes, the slopes of roads and the banks of ditches. A lasting protection against erosion may mostly be obtained in such cases by planting these regions with grass. However, as long as the grass has not developed sufficiently a temporary protection is necessary all the same.

It has already been proposed to check water and wind erosion by treating the surface layers of the soil with water soluble high polymeric substances of a natural or synthetic nature, such, for example, as water soluble starch ethers, hydrolized polyacrylonitrile, polyvinylalcohol or carboxymethylcellulose. Actual practice, however, has shown that the protection against erosion obtained by means of said agents is not sufficiently resistant against a heavy or protracted downpour of rain, because the substances used are washed away by the rain water. This is especially the case on sandy soils, which for an appreciable portion consist of coarse sand grains, such as, for example, dune sand.

We have now found that the erosion of the surface layer of an erodible soil, more particularly of a cultivable soil, may be checked in an efficient and durable manner by treating the surface of said soil with an aqueous dispersion of water insoluble polyvinyl compounds. Such a treatment results in the formation of a water insoluble resilient crust on the surface of the soil so that an excellent and durable protection against wind and water erosion is obtained. Surprisingly we have found that the growth of sown or cultivated crops, such, for example as, grain, beets, grasses, potatoes or bulbs is not at all impeded or delayed by said treatment.

Owing to the circumstance that the seeds are retained by the insoluble polyvinyl compound at the place where they have been scattered on or planted in the soil and can no longer be displaced or entrained by the wind very homogeneous and abundant crops are obtained on cultivated land treated according to the invention. Owing to the fact that on parcels of land where soil drifts are liable to occur, the wind will entrain the seeds, it is often necessary in periods of drought to repeat several times the sowing of a crop, such as for example, beets, on these parcels if a good harvest is to be obtained. It will be clear, therefore, that when the method according to the invention which renders this entirely superfluous, is applied important economic advantages are achieved.

In the present method all polymeric vinyl compounds capable of forming aqueous dispersions can be used. Examples of polyvinyl compounds that are suitable for the present purpose are homo- and copolymers of vinyl compounds, such as vinylacetate, vinyl propionate, acrylic acid and methacrylic acid esters, acrylonitrile, vinylchloride, ethylene, butadiene and styrene. In many cases it is desirable or necessary for obtaining a coherent and supple film to add a plasticizer to the aqueous dispersion of the polyvinyl compound. Both the composition and the degree of polymerization of the polymer and the nature and the amount of the plasticizer admit of being varied within wide limits. Preferably an aqueous dispersion of polyvinylacetate is used.

The treatment may be effected by spraying the soil to be protected against erosion with an about 2–20% aqueous dispersion of the water insoluble polyvinyl compound. Such dispersions may be obtained by diluting the commercially available concentrated dispersions or by using dry powdered preparations which on being stirred with water will produce dispersions. The surface layer of the soil is moistened during the treatment down to a depth of a few millimeters and after the dispersion has dried a protective crust will have formed on the surface. The amount of polyvinyl compound to be applied depends on the nature of the soil to be treated and generally varies from 5 to 50 grams per square meter. In most cases excellent results are already obtained when using amounts of from 5–20 grams per $m^2$. Furthermore we have found that an excellent and durable protection against erosion is likewise obtained by means of aqueous dispersions of a water insoluble polyvinyl compound to which a water soluble high polymeric colloid has been added. Examples of such soluble high polymeric colloids are starch, gums and plant slimes or modifications of said substances, such, for example, as ethers and esters, furthermore water soluble cellulose ethers and esters, proteins, sodium polyacrylate and polyvinylalcohol.

The amount of soluble colloid to be added may vary within wide limits; very good results may generally be obtained with equal amounts of polyvinyl compounds and hydrophylic colloid, but it is also possible to use larger or smaller amounts dependent on the desired degree of resistance to water of the crust to be formed. In this embodiment of the invention it is also possible to so proceed that a concentrated dispersion of the water-insoluble polyvinyl compound is diluted with an aqueous solution of the hydrophylic colloid, e.g. a water soluble starch ether. It is also possible to stir dry preparations containing both the water insoluble polyvinyl compound and the water-soluble high polymeric colloid with cold or warm water to form a diluted dispersion. Such dry preparations may be obtained by simply mixing powdery water-dispersible polyvinyl compounds and dry hydrophylic high polymeric substances, but they may also be prepared by simultaneously drying the soluble high polymeric colloid and an aqueous dispersion of the polyvinyl compound e.g. by spray-drying or by drying on heated drums.

According to a preferred embodiment of the invention water soluble starch derivatives, particularly starch ethers, are added to the aqueous dispersion of the insoluble polyvinyl compound, favourable results being obtained with amounts of from 5–20 grams of this composition per $m.^2$ for stabilizing the surface layers of widely different soils.

With the above combinations of insoluble polyvinyl compounds and soluble high polymeric colloids particular effects are achieved. Surprisingly it has been found that the protective action obtained by spraying a diluted aqueous dispersion of the polyvinyl compound is increased by the addition of the high polymeric colloid. Another important advantage is that the high polymeric colloid notwithstanding the fact that it is water-soluble, is much more slowly washed out of the treated surface by water. This especially holds good for preparations containing starch products e.g. cold swelling starches or starch ethers.

Other substances may also be added to the dispersions to be sprayed, such as colloidal clays or fibrous materials capable of supporting the erosion inhibiting action, fungicides, insecticides and more particularly herbicides (weed killers). For this purpose the well-known herbicides may be used, such as aryloxy compounds, e.g. 2,4-dichlorophenoxy acetic acid (known under the name of 2–4 D), carbamates and urea derivatives, e.g. isopropyl N-(3-chlorophenyl)-carbamate (known under the name of Chloro IPC), chlorinated acids, e.g. trichloro acetic acid (known under the name of TCA), phenols, e.g. pentachlorophenyl (known under the name of PCP) and dinitro compounds, e.g. 4,6-dinitro-o-cresol (known under the name of DNOC). They can be applied in amounts of e.g. ½–10 kg. per hectare.

If desired the stabilization of the surface layers of the soil may be combined with the sowing of the crop by making a suspender of the seed e.g. grass seed, in the dispersion to be sprayed. The combination of the film forming polyvinyl compounds and the pesticides has the advantage that the latter substances are retained by the film former so that they will exert a more protracted and more effective action. A similar effect is obtained when combining the film forming substance with seeds which will be retained by the film. As has already been observed hereinbefore the thin crust formed does not adversely affect the growth of the plants.

The invention will be further elucidated with reference to the following examples:

*Example I*

Calcareous dune soil, i.e. the mixed soil of low fen and sand found behind the dunes, in which bulbs of tulips, hyacinths and narcissi are grown, is sprayed with a 10% aqueous dispersion of polyvinyl acetate containing 0.3% by volume of Chloro-IPC as herbicide. The dispersion is applied to the surface of the soil in an amount of 2000 liters of dispersion per hectare. Immediately after the spraying an drying a thin resilient crust has formed on the surface of the sandy soil; this crust is porous and does not interfere with the air-water-economy of the soil. The crust does not at all impede the development and the growth of the tulips, hyacinths and narcissi and is found to be extraordinarily resistant against the climatological influences of weather, wind and temperature; after subjecting the treated soil to an artificial rain for seven twenty-four hour periods the crust is still entirely intact when the soil has dried again. It was found that the herbicide used effectively counteracted the development of weeds.

*Example II*

A shifting dune parcel recently sowed with the seeds of beach grass is sprayed with an 8% aqueous dispersion of a styrene butadiene-copolymer in an amount of 3000 liters of liquid per hectare. A short time after spraying and drying a thin, tough crust has formed on the surface of the sand, which is very resistant against the influence of rain and wind. After some weeks the beach grass has uniformly and excellently developed on the sprayed sandy tract, so that the growth of the grass has not been impeded by the crust applied. On an adjacent parcel sown with beach grass which, however, had not been sprayed only a slight percentage of the beach grass reached its full development owing to the seed being blown away and the small plants being damaged by rolling sand grains.

*Example III*

The surface of a profiled body of sand of a road under construction is sprayed with a 4% aqueous dispersion of polyvinylacetate, the aqueous phase of which contains 40 grams per liter of a water soluble hydroxyethylether of cassava starch having an average degree of substitution of 1.4 hydroxyethyl groups per glucose unit. The dispersion is applied to the surface in an amount of 2000 liters of liquid per hectare. Immediately after spraying and drying a thin, tough porous crust has formed on the surface of the body of sand. For purposes of comparison an area of the same size of the body of sand is sprayed with a 4% solution of the hydroxyethylether of cassava starch, likewise in an amount of 2000 liters of liquid per hectare. The two areas treated are subsequently subjected to artificial rain for 5 days and nights and again dried, whereupon a top layer of a thickness of 5 mm. is analyzed in various places of the two areas. In the surface layer treated with the mixture of polyvinylacetate and the water soluble starch ether 76% of the starch derivative originally applied appears still to be present on an average, whereas the surface layer only sprayed with a solution of the starch derivative is found to contain only 23% of the original amount of the starch product on an average.

*Example IV*

600 parts by weight of potato starch are suspended in 1000 parts by weight of a 30% aqueous dispersion of polyvinylacetate containing 10% of dibutylphthalate calculated on the dry substance. The mixture is dried in a thin layer on heated drums, whereupon the dry product is ground.

Of the preparation thus obtained a 5% aqueous dispersion is prepared and with this dispersion the one half of a bare sandy tract is sprayed in an amount of 3000 liters of liquid per hectare. The other half of the sandy tract is treated with a solution of cold swelling potato starch in an amount of 150 kg. of starch per hectare. It appears that the crust obtained by means of the mixture of cold swelling starch and polyvinylacetate is appreciably more resistant against the influence of weather and wind than the crust obtained with the cold swelling starch.

*Example V*

Beet seed is sown on agricultural land having a soil consisting of reclaimed high fen mixed with sand, which in spring is liable to heavy soil drifts and which in consequence must as a rule be sown again twice or thrice each spring if a good stand of the crop is to be obtained.

After sowing the land the surface thereof is sprayed with a 7.5% aqueous dispersion of polyvinylacetate in an amount of 15 grams of polyvinylacetate per $m.^2$ of land.

Immediately after the spraying and drying a thin, tough, porous crust has formed on the surface of the arable land. The beet seed, however, is found to germinate and develop in the normal manner while owing to the film applied the tender young plants are not damaged or destroyed by the drifting soil particles during their further growth. The spraying of the land with the polyvinylacetate dispersion therefore results in an appreciable economization in labour and seed.

*Example VI*

The surface of a peaty horticultural soil which has been sown with the seed of carrots and lettuce is sprayed with a 4% aqueous dispersion of polyvinylacetate, the aqueous phase of which contains 40 grams per liter of a water soluble hydroxyethylether of cassava starch having an average degree of substitution of 1.4 hydroxyethyl groups per glucose unit. The dispersion is applied to the surface in an amount of 1500 liters per hectare, so that when said dispersion has dried a homogeneous, thin and durable crust has formed on the surface of the ground. The carrot and lettuce seed, however, comes up in the normal manner and the young plants prosper. The soil which in untreated condition is liable to heavy drifts in the case of dry weather and a hard wind is fully protected against wind erosion by the crust formed thereon. Consequently the young carrot and lettuce plants are not damaged or destroyed by rolling and shifting grains of soil.

Example VII

As in Example VI the surface of an agricultural soil liable to be eroded by wind is treated with a 4% aqueous dispersion of polyvinylacetate which instead of 40 grams of starch ether contains 40 grams of comminuted cellulose per liter.

In this case too soil drifts are entirely stopped, while the development and the growth of the sown carrots and lettuce proceeds normally.

Example VIII

As in example VI the surface of a wind erodible agricultural soil is treated with a 4% aqueous dispersion of polyvinylacetate which instead of 40 grams of starch ether per litre contains 40 grams of the sodium salt of carboxymethylcellulose having an average degree of substitution of 0.5 ether groups per glucose unit.

The results of this treatment correspond with those of the two preceding examples.

I claim:

1. A method of stabilizing the soil surface against wind and water erosion which comprises applying to said surface an aqueous dispersion of a water-insoluble polyvinyl compound, said dispersion containing a water-soluble high polymeric colloid, thereby forming a water-insoluble resilient crust on said surface in which the soil particles are bonded together.

2. A method of stabilizing the soil surface against wind and water erosion which comprises applying to said surface an aqueous dispersion of a water-insoluble polyvinyl compound, said dispersion containing a water-soluble polysaccharide, thereby forming a water-insoluble resilient crust on said surface in which the soil particles are bonded together.

3. A method of stabilizing the soil surface against wind and water erosion which comprises applying to said surface an aqueous dispersion of a water-insoluble polyvinyl compound, said dispersion containing a water-soluble starch product, thereby forming a water-insoluble resilient crust on said surface in which the soil particles are bonded together.

4. A method of stabilizing the soil surface against wind and water erosion which comprises applying to said surface an aqueous dispersion of insoluble polyvinyl acetate containing a water-soluble starch ether.

5. A method of stabilizing the soil surface against wind and water erosion which comprises applying to said surface an aqueous dispersion of a water-insoluble polyvinyl compound, said dispersion containing a herbicide, thereby forming a water-insoluble resilient crust on said surface in which the soil particles are bonded together.

References Cited in the file of this patent

UNITED STATES PATENTS

| | | |
|---|---|---|
| 2,625,529 | Hedrick | Jan. 13, 1953 |
| 2,702,965 | Boyd | Mar. 1, 1955 |
| 2,957,834 | Moller | Oct. 25, 1960 |

FOREIGN PATENTS

| | | |
|---|---|---|
| 212,372 | Australia | Jan. 20, 1958 |

OTHER REFERENCES

Condensed Chemical Dictionary, Fifth Edition, published by Reinhold (N.Y.), 1956. Pages 266 and 1040 relied upon.